United States Patent [19]

Nagaura et al.

[11] Patent Number: 4,828,834
[45] Date of Patent: May 9, 1989

[54] RECHARGEABLE ORGANIC ELECTROLYTE CELL

[75] Inventors: Toru Nagaura; Masaaki Yokokawa; Toshio Hashimoto, all of Fukushima, Japan

[73] Assignee: Sony Corporation, Tokyo, Japan

[21] Appl. No.: 114,282

[22] Filed: Oct. 29, 1987

[30] Foreign Application Priority Data

Oct. 29, 1986 [JP] Japan ............................... 61-257479
May 1, 1987 [JP] Japan ............................... 62-107989

[51] Int. Cl.$^4$ ............................................. H07M 4/50
[52] U.S. Cl. .................................... 429/194; 429/224
[58] Field of Search ................................. 429/224, 194

[56] References Cited

U.S. PATENT DOCUMENTS 4,312,930 1/1982 Hunter ............................ 429/224 X Primary Examiner—Stephen J. Kalafut
Attorney, Agent, or Firm—Hill, Van Santen Steadman & Simpson

[57] ABSTRACT

A rechargeable organic electrolyte cell includes a cathode mainly composed of $LiMn_2O_4$, obtained by sintering manganese dioxide with either lithium carbonate or lithium iodide.

8 Claims, 8 Drawing Sheets

RECHARGEABLE ORGANIC ELECTROLYTE CELL

BACKGROUND OF THE INVENTION

This invention relates to a rechargeable organic electrolyte cell expected to be used as a power source for a variety of small sized electronic apparatuses.

So-called organic electrolyte cells, making use of lithium as the anode active material and an organic electrolyte as the electrolyte, are low in self-discharging, high in voltage and excellent in shelf life, so that they may be used with high operational reliability for a prolonged period of five to ten years. For this reason, they are used at present extensively in electronic time pieces or as a variety of memory backup power sources.

However, the presently used organic electrolyte cells are primary cells, such that their service life is terminated when used once so that they leave a lot to be desired especially from economic considerations.

For this reason, with the rapid progress in a variety of electronic apparatuses, a strong demand has been raised for rechargeable organic electrolyte cells that can be used conveniently and economically for a prolonged time, and many researches are being conducted for developing this type of cells.

In general, metal lithium, lithium alloys, such as Li-Al alloys, electroconductive polymer materials, such as polyacetylene or polypyrrole, doped with lithium ions, or intercalation compounds with lithium ions mixed into crystals thereof, are used as the anodic material of the cell, while an organic electrolytic solution is used as the electrolyte thereof.

On the other hand, various materials have been proposed as the cathodic active material. Examples of these materials include $TiS_2$, $MoS_2$, $NbSe_2$ or $V_2O_5$, as disclosed in the Japanese Laid-Open Patent Publication No. 54836/1975.

The discharging reaction of the cell making use of these materials proceeds as the lithium ions of the anode are intercalated into the spacings between these materials, whereas the charging reaction proceeds as the lithium ions are deintercalated from these spacings towards the anode. In other words, the charging and discharging proceeds by a repetition of the reactions in which the lithium ions of the anode make entrance into and exit from the interlayer spacings of the cathode active material. For example, when using $TiS_2$ as the cathode active material, the charging and discharging reaction may be represented by the formula

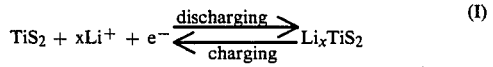

$$TiS_2 + xLi^+ + e^- \underset{charging}{\overset{discharging}{\rightleftarrows}} Li_xTiS_2 \qquad (I)$$

With the conventional cathodic material, charging and discharging proceeds by the above reaction. However, the conventional cathodic material has a deficiency that, with the repetition of the charging and discharging reactions, the discharge capacity thereof is decreased gradually. It is because the lithium ions, once having made an entrance into the cathode active material, tend to exit therefrom only with increased difficulties, such that only a limited fraction of the lithium ions having made an entrance into the cathode active material by discharging are returned towards the anode by the charging reaction. In other words, the lithium ions are caused to remain in the cathode in the form of $Li_x$-$TiS_2$ so that the number of the lithium ions taking part in the ensuing charging reaction is decreased. The result is that the discharge capacity of the cell after the charging is decreased and the cyclic service life characteristics of the cell are correspondingly lowered.

OBJECT AND SUMMARY OF THE INVENTION

It is an object of the present invention to provide an improved rechargeable organic electrolyte cell.

It is another object of the present invention to provide a rechargeable organic electrolyte cell superior in charge-discharge cycle characteristics.

It is another object of the present invention to provide a rechargeable organic electrolyte cell which is charged and discharge up to nearly full capacity of the active material contained in the cell.

According to one aspect of the present invention, there is provided a rechargeable organic electrolyte cell which comprises an anode containing Li, a cathode formed of $LiMn_2O_4$ and an organic electrolyte. The $LiMn_2O_4$ preferable has a full width at half maximum between 1.1° and 2.1° of a peak at $2\theta$ equal to 46.1 by X-ray diffraction analysis using $FeK\alpha$ ray.

DESCRIPTION OF THE PREFERRED EMBODIMENTS

Figure 1:
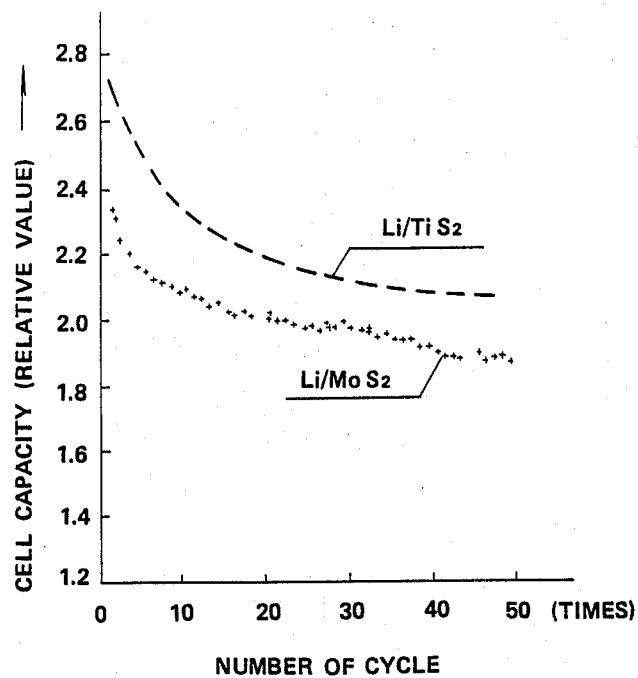
FIG. 1 is a chart showing charging and discharging cycle characteristics of a rechargeable organic electrolyte secondary cell making use of $TiS_2$ and $MoS_2$ as the cathode material.

With a view towards achieving the above objects, the present inventors conducted various and repeated investigations into finding a material less subject to deterioration in the intercalation of the lithium ions so as to be used as the cathode active material. As a result, thereof, we have obtained an information that a compound $LiMn_2O_4$ having the spinel structure gives favorable results. On the basis of such information, the present invention is characterized in that it comprises an anode containing lithium, a cathode formed essentially of $LiMn_2O_4$, and an organic electrolyte.

The compound $LiMn_2O_4$ employed as the cathode active material of the organic electrolyte cell according to the present rechargeable invention may be easily obtained by reacting lithium carbonate $Li_2CO_3$ and manganese dioxide $MnO_2$ by heating in 400° C. or by reacting lithium iodide LiI and manganese dioxide $MnO_2$ by heating in a nitrogen atmosphere at 300° C. The compound $LiMn_2O_4$ itself is shown for example in the U.S. Pat. No. 4,246,253 as the starting material for producing $MnO_2$. However, when a cell is prepared by using $LiMn_2O_4$ obtained in accordance with the teaching of the U.S. Pat. No. 4,246,253, that is, by a method including sintering lithium carbonate and manganese dioxide at a temperature of 800° to 900° C., as the cathode active material of the cell, the capacity of the order of only about 30 percent of the theoretical charging and discharging capacity of the cell is obtained.

Above all, by using $LiMn_2O_4$ in which the full width at half maximum of a diffraction peak at a diffraction angle of 46.1° in the case of in X-ray diffraction analysis using $FeK\alpha$ rays is in the range between 1.1° and 2.1°, as the cathode active material of the rechargeable organic electrolyte cell, the charging and discharging capacity nearly equal to the theoretical capacity may be obtained. While $LiMn_2O_4$ may be prepared by sintering lithium carbonate and manganese dioxide in air, the full width at half maximum value of the diffraction peak observed upon X-ray diffraction analysis is changed by adjusting the sintering temperature. According to the present invention, the compound $LiMn_2O_4$ in which the full width at half maximum of the diffraction peak at the diffraction angle of 46.1° in the case of an X-ray -diffraction analysis using $FeK\alpha$ rays is in the range of 1.1° and 2.1°, is selectively employed. When the full width at half maximum value is less than the above range, the desired discharging are not achieved.

Lithium iodide may be used in place of lithium carbonate, while the sintering may be performed in an inert gas, such as nitrogen, instead of in air.

As the lithium containing material, employed as the anode material, metal lithium, lithium alloys, such as LiAl, LiPb, LiSn, LiBi or LiCd, electroconductive polymer materials, such as polyacetylene or polypyrrole, doped with lithium ions, or intercalation compounds with lithium ions mixed into crystals thereof, such as $TiS_2$ or $MoS_2$ containing lithium in the intercalation spacings thereof, may be employed.

As the electrolyte solution, non-aqueous organic electrolytes may be employed in which a lithium salt is used as an electrolyte and dissolved in an organic solvent.

Example of the organic solvent may include one or a mixture of two or more of 1,2-dimethoxyethane, 1,2-diethoxyethane, α-butyrolactone, tetrahydrofuran, 2-methyltetrahydrofuran, 1,3-dioxolane or 4-methyl-1,3-dioxolane.

Examples of the electrolyte may include one or a mixture of two or more of $LiClO_4$, $LiAsF_6$, $LiPF_6$, $LiBF_4$ or $LiB(C_6H_5)_4$.

By using $LiMnO_4$ as the cathode active material of the rechargeable organic electrolyte cell, the lithium ions that have migrated towards the cathode by the discharging reaction may be optimally deintercalated during the charging reaction.

In addition, when $LiMn_2O_4$ in which the full width at half maximum of the diffraction peak at a diffraction angle of 46.1° in case of an X-ray diffraction analysis using $FeK\alpha$ rays is in the range between 1.1° and 2.1°, is selectively employed as the cathode active material of the non-aqueous electrolyte cell, it becomes possible to procure a charging and discharging capacity of not less than 90 percent the theoretical charging capacity of the material.

The description with reference to specific test examples is given below. It is to be understood that these examples are for illustration only and are not intended to limit the scope of the present invention.

COMPARATIVE EXAMPLE

The cycle characteristic of the $Li/TiS_2$ or $Li/MoS_2$ rechargeable organic electrolyte cell, making use of $TiS_2$ or $MoS_2$ as the cathode active material, were investigated. The results are shown in FIG. 1, from which it is seen that, with the rechargeable organic electrolyte cell making use of $TiS_2$ or $MoS_2$ as the cathode active material, the discharge capacity of the cell is rapidly decreased after the repetition of about ten charge-discharge cycles, such that the discharge current is only one half the original discharge capacity of the cell. It is also seen that the discharge capacity is continuously decreased with a further repetition of the charge-discharge cycles.

EXAMPLE 1

Figure 2:
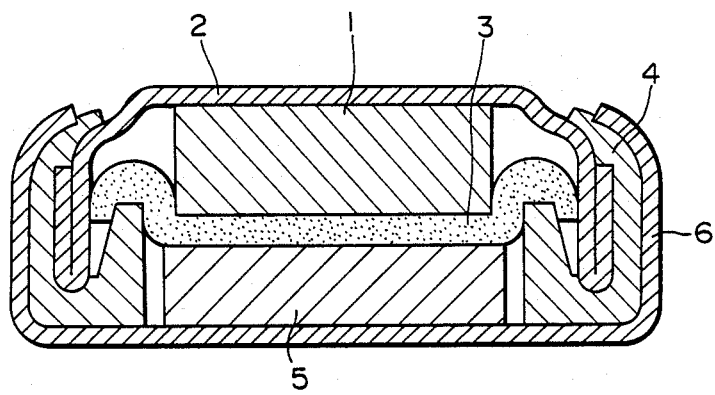
FIG. 2 is a diagrammatic sectional view showing an exemplary rechargeable organic electrolyte secondary cell.

In accordance with the following production steps, a button type cell shown in FIG. 2 was produced.

Figure 3:
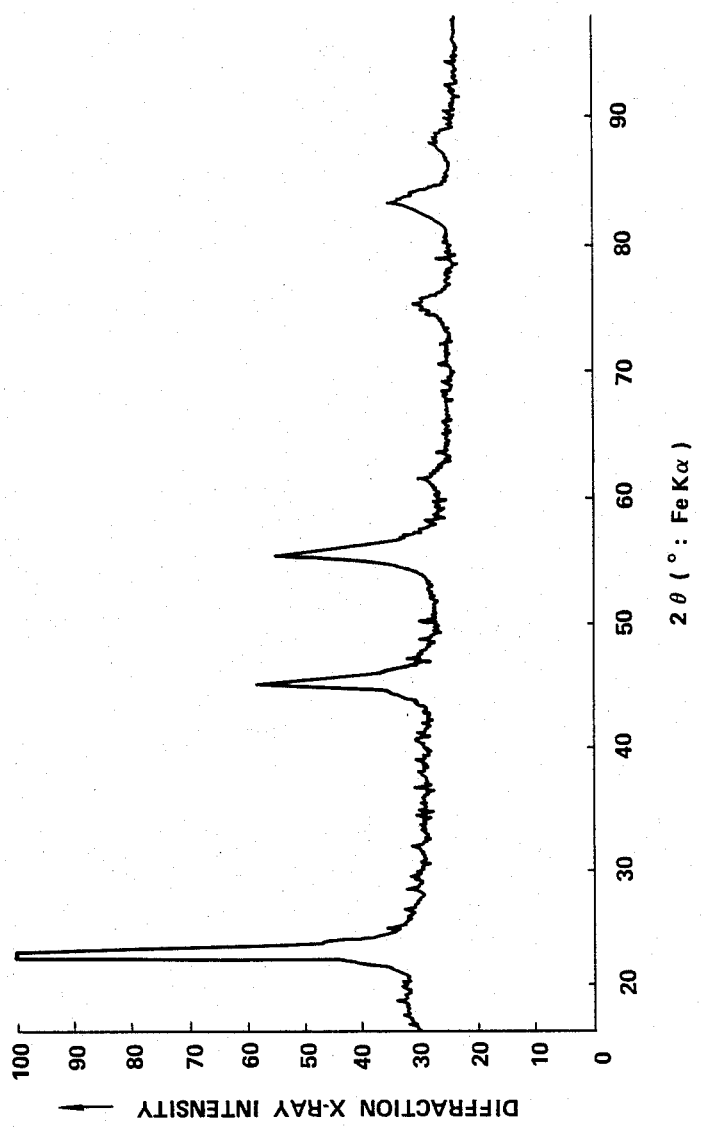
FIG. 3 is a chart showing the result of an X-ray diffraction analysis of $LiMn_2O_4$ synthesized from electrolytic manganese dioxide and lithium carbonate.

87 grams and 26 grams each of marketed manganese dioxide and lithium carbonate were thoroughly mixed in a mortar and the resulting mixture was heat-treated on an alumina boat in a nitrogen gas at 400° C. for 10 hours. The product obtained after cooling was subjected to an X-ray analysis, whereby a chart of the X-ray analysis as shown in FIG. 3 was obtained. In comparison with the material represented by the formula $LiMn_2O_4$ in the ASTM card, the chart was found to be coincident completely with the X-ray diffraction chart for $LiMn_2O_4$. Thus the material obtained by the above described process could be identified to be $LiMn_2O_4$.

Then, 88.9 parts by weight of $LiMn_2O_4$ produced by the above described process were admixed with 9.3 parts by weight of graphite and then with 1.8 parts by weight of polytetrafluoroethylene as the binder. The resulting mixture was then press-formed into a pellet of 15.5 mm in diameter and 0.3 mm in thickness under application of a pressure of 3 tons/cm². The pellet thus produced was dried in vacuum at 300° C. for five hours to a cathode pellet 5.

On the other hand, an aluminum foil of 0.3 mm in thickness was punched to a disk shaped piece of 15.5 mm in diameter, which was then spot welded to an anodic can 2. A lithium foil of 0.3 mm in thickness was punched to a disk shaped piece of 15 mm in diameter, which was then press bonded onto the aluminum foil piece to form an anodic pellet 1 to be used as an anode.

On this anode was placed a non-woven propylene cloth as a separator 3 and propylene carbonate with LiClO$_4$ dissolved therein at a rate of 1 mol/liter was added as an electrolyte solution. A gasket 4 formed of a suitable synthetic material was press fitted to the anode and the previously obtained cathode pellet 5 was placed on the separator 3. A cathodic can 6 was placed over the cathode pellet and caulk for hermetically sealing an opening that may be present between it and the gasket 4 to form an rechargeable organic electrolyte cell having an outside diameter of 20 mm and a thickness of 1.6 mm.

Figure 4:
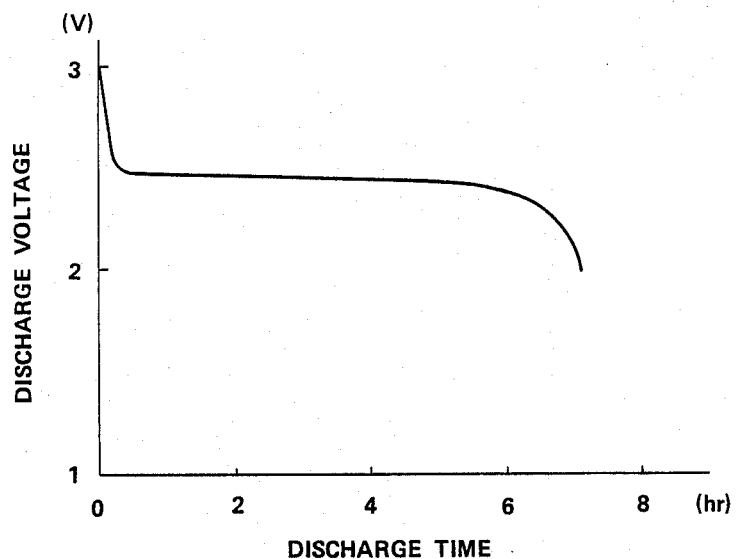
FIG. 4 is a chart showing discharging characteristics of an rechargeable organic electrolyte secondary cell according to the present invention.

The sample cell obtained as above was subjected to a discharge test through a resistor of 1 kiloohm. The discharge curve shown in FIG. 4 was obtained.

The discharge reaction may be expressed by the following reaction formula

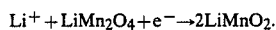

$$Li^+ + LiMn_2O_4 + e^- \rightarrow 2LiMnO_2.$$

Figure 5:
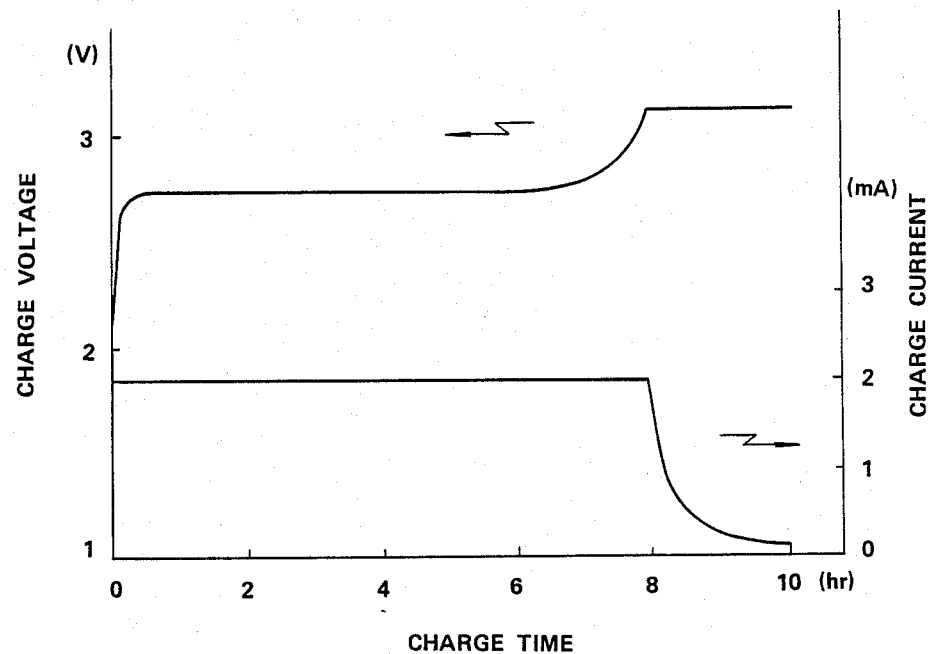
FIG. 5 is a chart showing charging characteristics of an organic electrolyte secondary cell according to the present invention.

The completely discharged sample cell was then charged with a current of 2 mA with the upper voltage setting of 3.1 V. The results are shown in FIG. 5. It is seen from this figure that the charging voltage curve is extremely flat. This possibly implies that deintercalation of lithium ions in the charging reaction shown by the formula

$$2LiMnO_2 \rightarrow LiMn_2O_4 + Li^+ + e^-$$

has proceeded smoothly.

Figure 6:
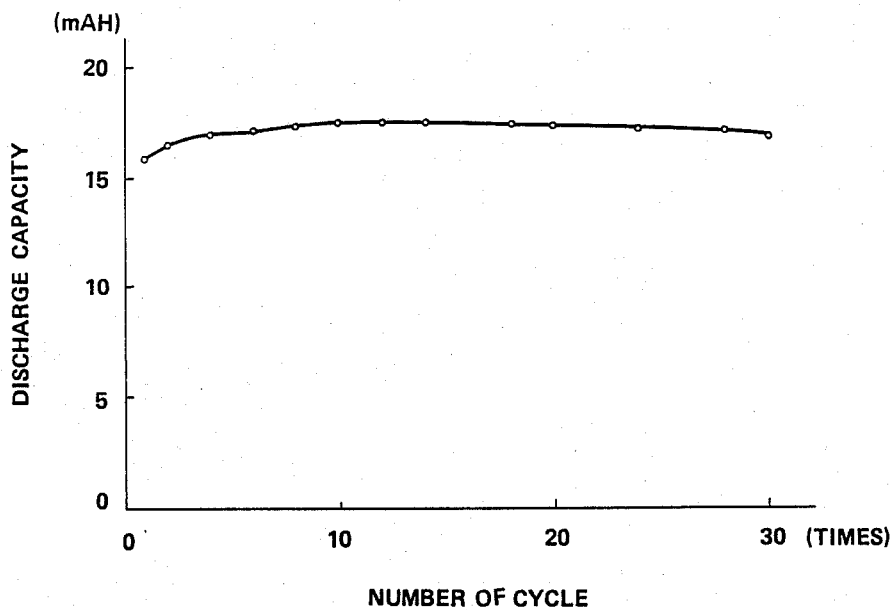
FIG. 6 is a chart showing charge-discharge cycle characteristics of an organic electrolyte secondary cell according to the present invention.

The sample cell showing the charging and discharging characteristics as described above was charged and discharged repeatedly for investigating into cyclic charge-discharge characteristics of the sample cell. It was seen that, as shown in FIG. 6, deterioration in the discharge capacity due to the cyclic charging and discharging was not observed in the least and the obtained rechargeable cell had truely superior properties.

EXAMPLE 2

In the present Example 2, various LiMn$_2$O$_4$ samples were prepared using various sintering temperatures and so-called button-type cells were prepared with the use of these samples to investigate into the charge-discharge characteristics of these cells.

First, in order to produce LiMn$_2$O$_4$ having favorable properties as the cathode active material of the organic electrolyte cell, the sintering temperatures of LiMn$_2$O$_4$ were changed variously to investigate into changes in the X-ray diffraction peaks and in discharge capacities cause by these changes in the sintering temperatures.

For producing the LiMn$_2$O$_4$ sample, 86.9 grams (1 mol) and 18.5 grams (0.25 mol) each of marketed manganese dioxide and lithium carbonate were mixed while being ground thoroughly in a mortar. The resulting mixture was sintered in air for one hour on an alumina boat at a sintering temperature of 430° to 900° C.

Figure 7:
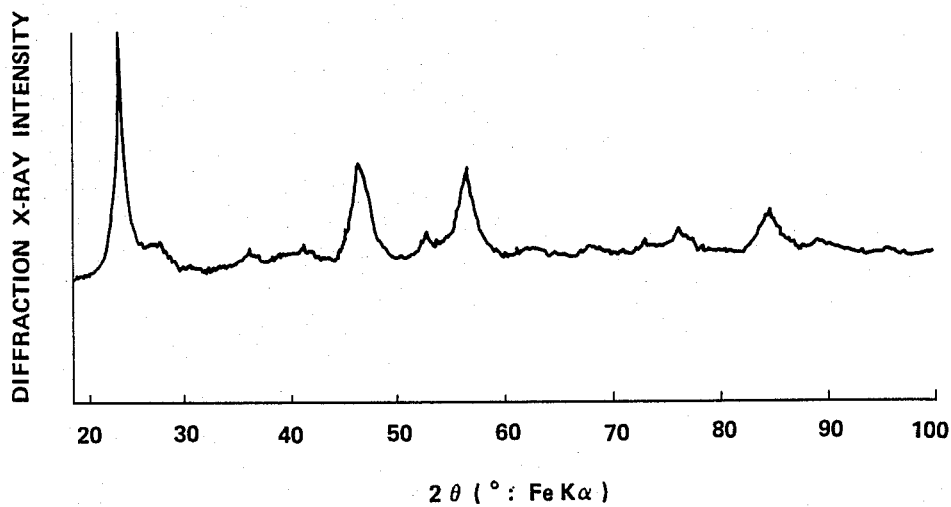
FIG. 7 is a chart showing the result of an X-ray diffraction analysis of $LiMn_2O_4$ synthesized from electrolytic manganese dioxide and lithium carbonate.

The product was cooled and analyzed by the X-ray diffraction analysis using FeK$\alpha$ rays and the measurement conditions including the tube voltage of 30 kV, tube current of 15 mA, measurement range of 2000 cps, scanning speed of 1°/min., chart speed of 5 mm/min., diffusion slit width of 1° and the light slit width of 0.6 mm. On collation with the card index of the American Society for Testing Materials (ASTM), the product could be identified to be LiMn$_2$O$_4$. FIG. 7 shows an X-ray diffraction spectrum of LiMn$_2$O$_4$ obtained at a sintering temperature of 460° C., as an example. The full width at half maximum of the diffraction peak at a diffraction angle of 46.1° is 2.08°, which is larger than that of LiMn$_2$O$_4$ obtained by sintering at 800° to 900° in accordance with the conventional production process thereof. The full width at half maximum data for LiMn$_2$O$_4$ obtained by sintering at various other sintering temperatures are summarized in Table 1.

Then, using the LiMn$_2$O$_4$ samples obtained at the respective sintering temperatures as described above, organic electrolyte cells such as shown in cross-section in FIG. 2 were prepared. 86.4 parts by weight of LiMn$_2$O$_4$ were thus admixed with 8.6 parts by weight of graphite and 5 parts by weight of polytetrafluoroethylene (Teflon) to a cathodic composition which was then formed a cathodic pellet 5 of 15.5 mm in diameter and 0.44 mm in thickness and having a weight of 0.213 gram.

A marketed aluminum plate of 0.3 mm in thickness was punched to a disk shaped piece of 15 mm in diameter and bonded to an anodic can 2 by spot welding. A lithium foil of 0.18 mm in thickness was punched to a disk shaped piece of 15 mm in diameter and press bonded to the aluminum piece to an anodic pellet 1 to form an anode.

Then a separator 3 was applied to the anode and a gasket 4 formed of a suitable synthetic material was fitted thereto. Then, an electrolyte solution mixture of 1,2-dimethoxyethane and propylene carbonate with LiClO$_4$ dissolved therein at a rate of 1 mol/liter was introduced. The previously produced cathodic pellet 5 was applied to the separator 3 and then covered by a cathodic can 6, which was then caulked for hermetically sealing an opening or gap between it and the anode to produce a so-called button type organic electrolyte cell having a diameter of 20 mm and a thickness of 1.6 mm.

Using the LiMn$_2$O$_4$ samples prepared in this manner at the various sintering temperatures, organic electrolyte cells A, B, C, D, E, F, G, H, I, J and K were produced. In Table 1, these cell appellations are entered in association with the sintering temperatures for the LiMn$_2$O$_4$ samples used in the cells.

Investigations were made into charging and discharging characteristics of the thus produced organic electrolyte cells A through K.

TABLE 1

| cells | sintering temperature | discharge capacity | full width at half maximum at a X-ray diffraction angle of 46.1° |
|---|---|---|---|
| A | 430° C. | 24.0 mAH | 1.80° |
| B | 450 | 25.9 | 2.10 |
| C | 460 | 25.6 | 2.08 |
| D | 480 | 24.9 | 1.91 |
| E | 500 | 23.5 | 1.55 |
| F | 520 | 20.3 | 1.10 |
| G | 550 | 17.4 | 0.93 |
| H | 600 | 14.6 | 0.78 |
| I | 700 | 12.4 | 0.57 |
| J | 800 | 10.0 | 0.35 |
| K | 900 | 7.5 | 0.26 |

These organic electrolyte cells were respectively connected to resistances of 1 kiloohm and the discharge characteristics were measured with the terminal voltage of 2.0 V. The results are shown in Table 8, wherein the cell voltage V and the discharge time Hr are plotted on the ordinate and the absissa, respectively. From this figure, the mean discharge voltage may be read and converted into the mean discharge current which may then be multiplied by the duration of discharging until reaching the terminal voltage to give the discharge capacity in terms of the ampere-hour capacity, which is given herein by units of mAH since the resistnace of 1 kiloohm is used in the present measurement system. The discharge capacities obtained in this manner are also shown in Table 1.

Figure 8:
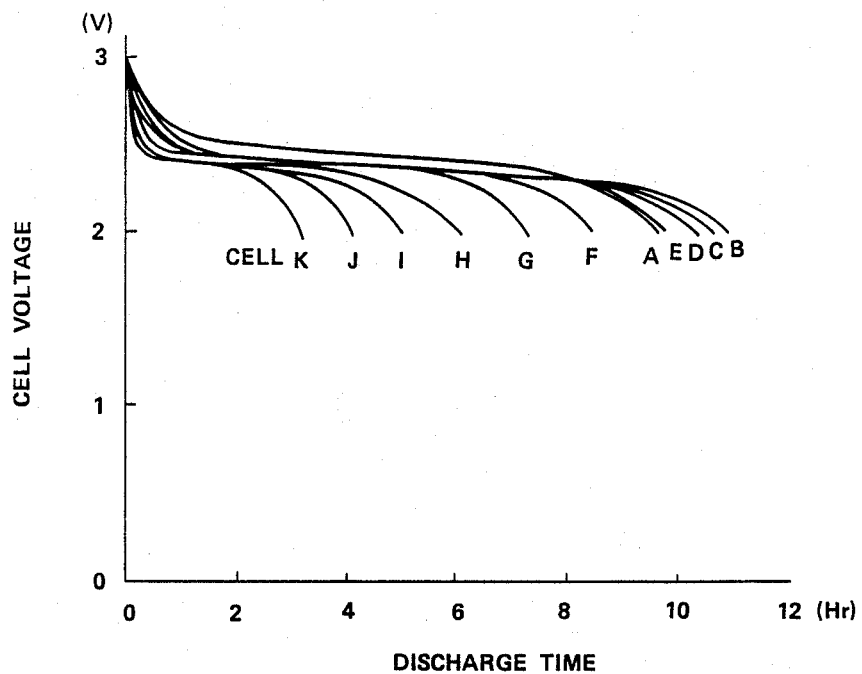
FIG. 8 is a chart showing the difference in the discharging characteristics caused by the difference in the full width at half maximum of the diffraction peak of $LiMn_2O_4$ employed in the cell.
Figure 9:
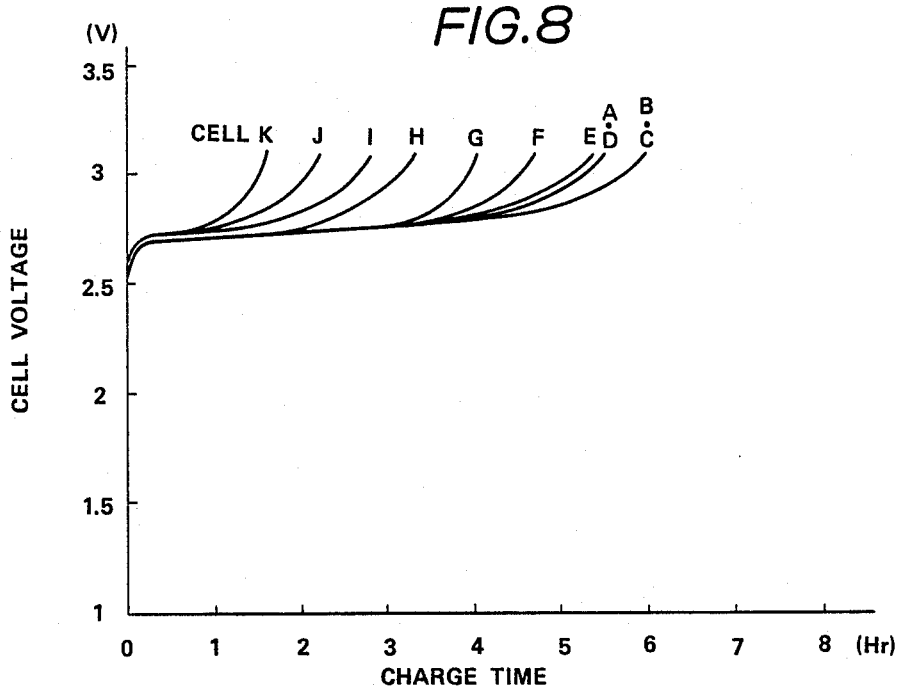
FIG. 9 is a chart showing the difference in the charging characteristics caused by the difference in the full width half maximum of the diffraction peak of $LiMnO4$ employed in the cell.

Then, with the terminal voltage being set to 3.1 V, the current of 4 mA was caused to flow through each of the thus discharged cells, for measuring the charging characteristics. The results are shown in FIG. 9, wherein the cell voltage V and the charging time Hr are plotted on the ordinate and the abscissa, respectively. The organic electrolyte cell according to the present invention has extremely stable charge-discharge characteristics, as may be seen from FIGS. 8 and 9 showing that the major portions of the curve for each cell are flat, that is, do not show voltage changes with the charging time. This is an indication that intercalation and deintercalation of lithium ions into and from the spacings between the adjoining $LiMn_2O_4$ layers occur extremely promptly and thus $LiMn_2O_4$ obtained in the above described manner has superior properties as the cathode active material.

Figure 10:
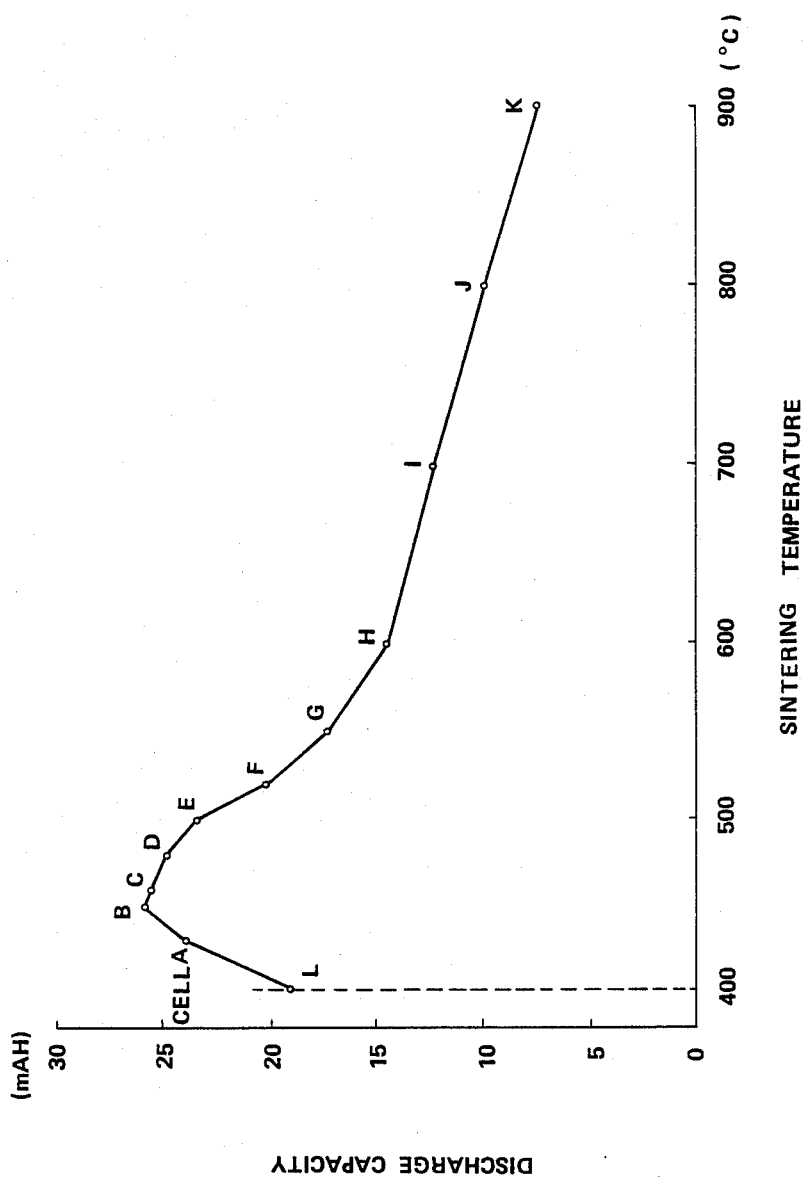
FIG. 10 is a chart showing the relation between the discharging capacity of the non-aqueous electrolyte cell and the sintering temperature of $LiMn_2O_4$.
Figure 11:
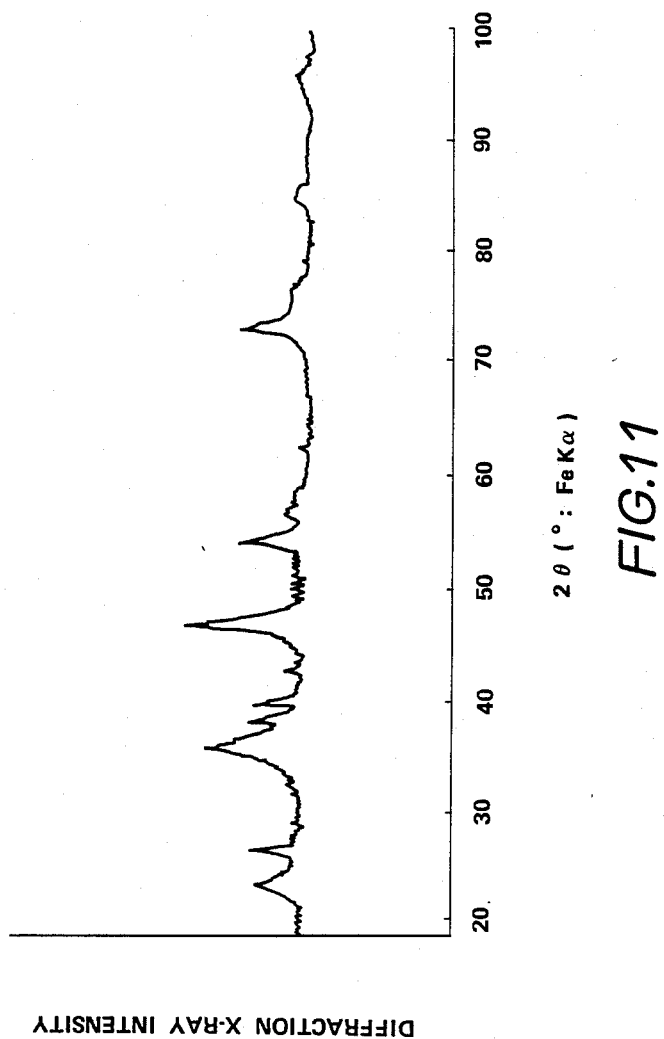
FIG. 11 is a chart showing the result of an X-ray diffraction analysis of $LiMn_2O_4$ synthesized from electrolytic manganese dioxide and lithium carbonate.

In FIG. 10, the relation between the discharge capacity and the sintering temperature shown in Table 1 is shown. In FIG. 10, the discharging capacity in mAH is shown on the ordinate and the sintering temperature in °C. is shown on the abscissa. It is seen from Table 1 and FIGS. 8 and 10 that the cells A, B, C, D, E and F have the excellent discharging capacity of not less than 20 mAH and hence are may meet practical demands and that the full width at half maximum values of $LiMn_2O_4$ as the cathode active material of these cells at an X-ray diffraction angle of 46.1° are all within the range of between 1.1° and 2.1°. The full width half maximum values may be controlled by changing the sintering temperature of $LiMn_2O_4$, with the optimum sintering temperature range being 430° to 520°. It has been found that the discharging capacity is gradually lowered when the sintering temperature higher than the above range is employed. The discharge capacity is similarly lowered when the sintering temperature lower than the above range is employed, such that, with the cell L making use of $LiMn_2O_4$ obtained by sintering at 400° C., the discharging capacity was lowered to 19.1 mAH, as shown in FIG. 10. The X-ray diffraction spectrum for this $LiMn_2O_4$ sample is as shown in FIG. 11. It is found from this figure that, with the lower sintering temperature of 400° C., parts of lithium carbonate and manganese dioxide remain unreacted, so that desired characteristics are not attained.

EXAMPLE 3

In the present Example, in preparing $LiMn_2O_4$, lithium iodide was used in place of lithium carbonate shown in the Example 1, while the sintering was performed in a nitrogen atmosphere instead of in air.

Figure 12:
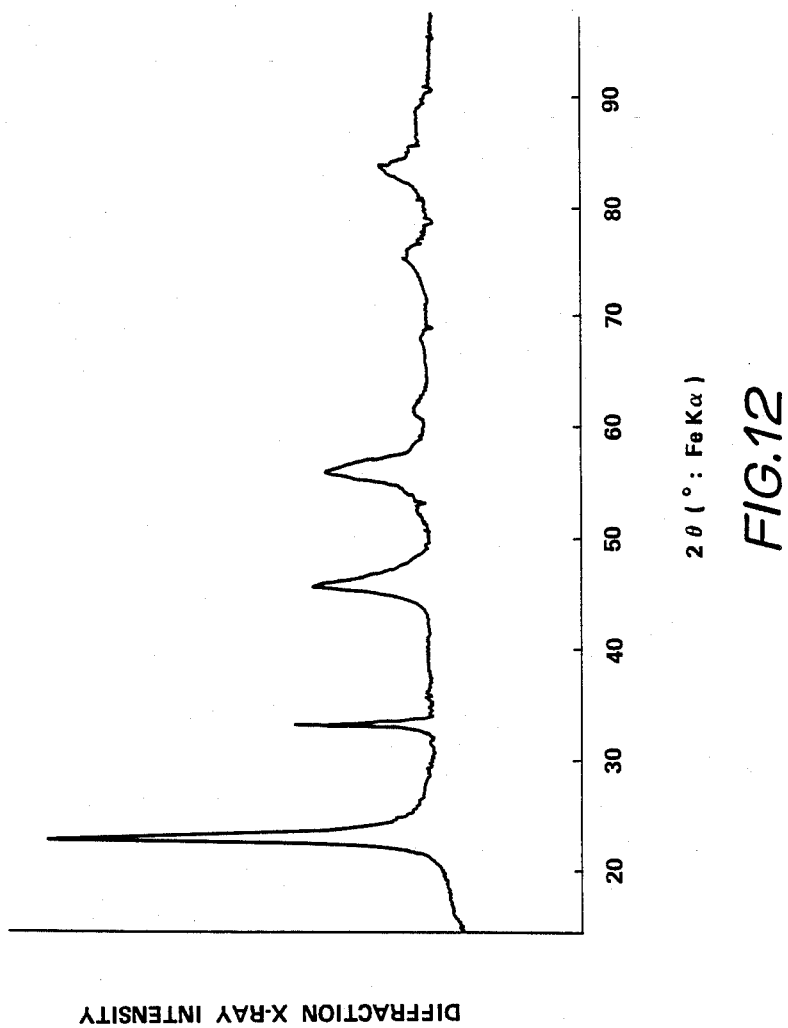
FIG. 12 is a chart showing an X-ray diffraction spectrum of $LiMn_2O_4$ obtained by sintering manganese dioxide and lithium iodide at 300° C.

50 grams (0.57 mol), 39 grams (0.29 mol) and 5.2 grams each of marketed manganese dioxide, lithium iodide and graphite were thoroughly mixed while being ground in a mortar and the resulting mixture was press molded into a pellet under a pressure of 3 tons/cm². This pellet was placed on an alumina boat and sintered in a nitrogen atmosphere at 300° C. for six hours. After sintered, the product was cooled and washed with ethyleneglycol dimethylether. The product was analyzed by X-ray diffraction analysis under the conditions specified in the Example 2, and was identified to be $LiMn_2O_4$ on collation with the card index of ASTM. The X-ray diffraction spectrum for this product is shown in FIG. 12. The full width at half maximum value of a peak at a diffraction angle of 46.1° was 1.57°. In this figure, the peak corresponding to graphite may also be seen in addition to the peaks appearing in FIG. 7.

Then, to 95 parts by weight of $LiMn_2O_4$ were added 5 parts by weight of polytetrafluoroethylene (Teflon) as a binder to give a cathodic composition. The ensuing assemblying of the organic electrolyte cell was performed in accordance with the method described in Example 2 to produce the cell sample M. The discharge capacity of the cell sample M was tested by a method according to the Example 2 and found to be as high as 23.1 mAH.

EXAMPLE 4

In the present Example 4, $LiMn_2O_4$ was prepared by sintering in a nitrogen atmosphere, as in Example 3, instead of in air.

86.9 grams (1 mol) and 18.5 grams (0.25 mol) each of marketed manganese dioxide and lithium carbonate were thoroughly mixed while being ground in a mortar. The produced mixture was placed on an alumina boat and sintered in a nitrogen atmosphere at 450° C. for one hour. The product was analyzed by the X-ray diffraction analysis under the conditions stated in the Example 1 and thereby identified to be $LiMn_2O_4$. The full width at half maximum value of the peak at a diffraction angle of 46.1° was 1.60°.

The ensuing assembling of the organic electrolyte cell was performed by the method according to the Example 2 to produce the cell sample N. The discharge capacity of the cell sample was tested by a method according to the Example 2 and found to be as high as 22.9 mAH.

From the foregoing it is seen that, by using $LiMn_2O_4$ as the cathode active material of the rechargeable organic electrolyte cell, the lithium ions once migrated towards the cathode during the discharging reaction may be optimally deintercalated during the charging reaction, with the result that the charge-discharge cycle life properties of the rechargeable organic electrolyte cell may be improved significantly.

In this manner there is provided an rechargeable organic electrolyte cell suffering from only limited deterioration in the cell capacity caused by repeated charge-discharge cycles and hence superior in cyclic life characteristics.

When $LiMn_2O_4$ used as the cathode active material of the rechargeable organic electrolyte cell has a specified full width at half maximum of the diffraction peak at a diffraction angle of 46.1° in the range of 1.1° to 2.1°, it is possible to elevate the charge-discharge characteristics of the cell obtained by using such cathode active material to higher than 90 percent its theoretical capacity.

Since $LiMn_2O_4$ is a less costly material, it is not only excellent from economic considerations as compared to conventional cathode active materials, such as $TiS_2$, $MoS_2$, $NbSe_2$ or $V_2O_5$, but also contributes to energy saving in the production process of the organic electrolyte cell.

We claim as our invention:

1. A rechargeable organic electrolyte cell comprising an anode containing Li, a cathode mainly composed of $LiMn_2O_4$ having a full width at half maximum of a diffraction peak at a diffraction angle of $2\theta$ equal to 46.1° in the range between 1.1° and 2.1°, upon an X-ray diffraction analysis using $FeK\alpha$, and an organic electrolyte.

2. A rechargeable organic electrolyte cell according to claim 1, wherein $LiMn_2O_4$ is obtained by sintering manganese dioxide and lithium carbonate.

3. A rechargeable organic electrolyte cell according to claim 1, wherein $LiMn_2O_4$ is obtained by sintering manganese dioxide and lithium iodide.

4. A rechargeable organic electrolyte cell according to claim 1, wherein $LiMn_2O_4$ is obtained by sintering manganese dioxide and lithium carbonate at a temperature between 430° C. and 520° C.

5. A rechargeable organic electrolyte cell comprising an anode containing Li, a cathode mainly composed of a lithium and manganese complex oxide corresponding to a chart of $LiMn_2O_4$ in ASTM card upon X-ray diffraction analysis having a full width at half maximum of a diffraction peak at a diffraction angle of $2\theta$ equal to 46.1° in the range between 1.1° and 2.1°, upon an X-ray diffraction analysis using $FeK\alpha$, and an organic electrolyte.

6. A rechargeable organic electrolyte cell according to claim 5 wherein the cathode material is obtained by sintering manganese dioxide and lithium carbonate.

7. A rechargeable organic electrolyte cell according to claim 5 wherein the cathode material is obtained by sintering manganese dioxide and lithium iodide.

8. A rechargeable organic electrolyte cell according to claim 5 wherein the cathode material is obtained by sintering manganese dioxide and lithium carbonate at a temperature between approximately 430° C. to about 520° C.

* * * * *